W. S. BUTLER.
FOLDABLE VEHICLE TOP.
APPLICATION FILED JUNE 10, 1908.
928,584.
Patented July 20, 1909.
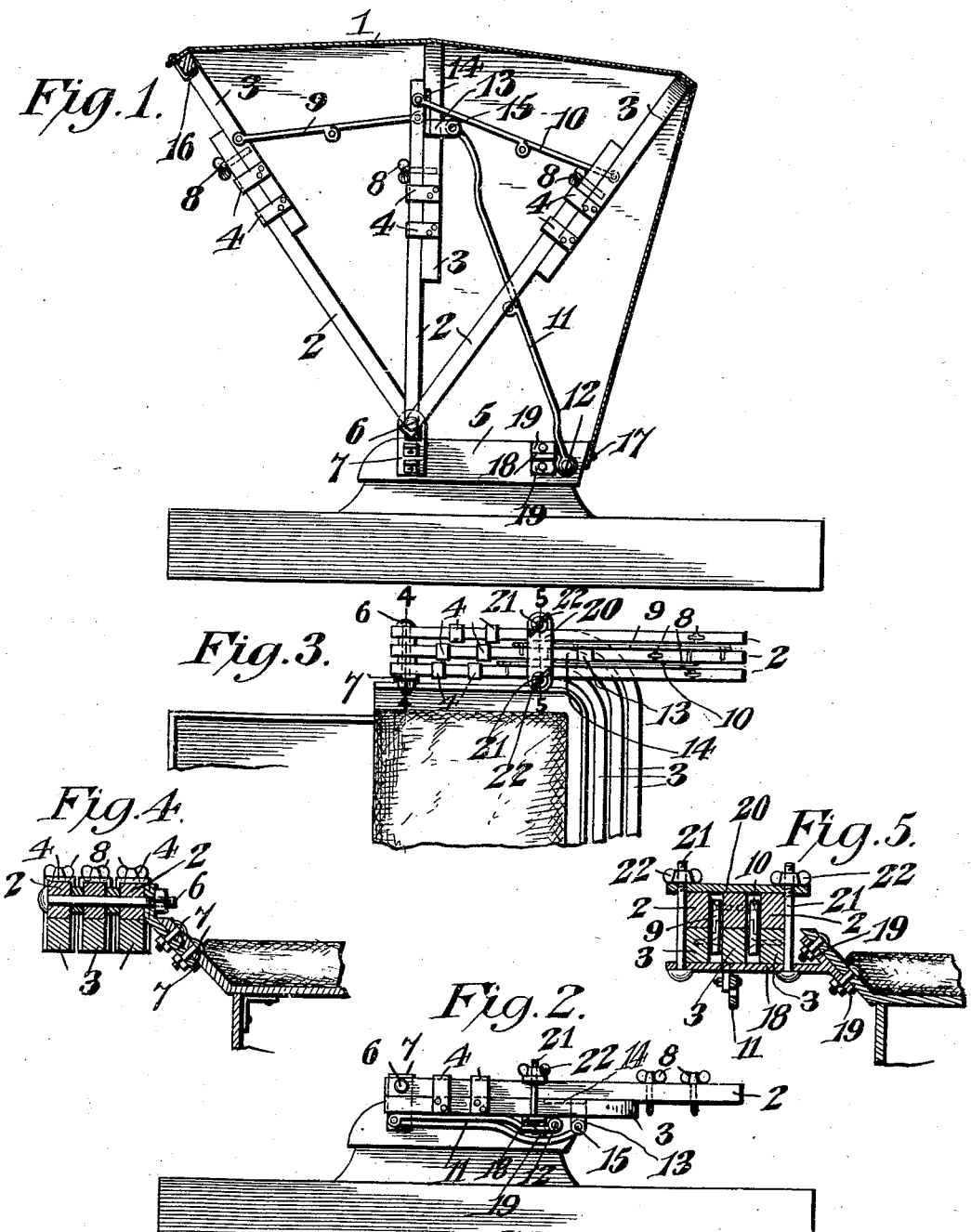
Witnesses
Jas. F. McCathran
H. F. Riley
William S. Butler, Inventor
By C. G. Siggers
Attorney

UNITED STATES PATENT OFFICE.

WILLIAM S. BUTLER, OF BOOTHWYN, PENNSYLVANIA.

FOLDABLE VEHICLE-TOP.

No. 928,584.  Specification of Letters Patent.  Patented July 20, 1909.

Application filed June 10, 1908. Serial No. 437,749.

*To all whom it may concern:*

Be it known that I, WILLIAM S. BUTLER, a citizen of the United States, residing at Boothwyn, in the county of Delaware and State of Pennsylvania, have invented a new and useful Foldable Vehicle-Top, of which the following is a specification.

The invention relates to improvements in foldable vehicle tops.

The object of the present invention is to improve the construction of foldable vehicle tops, and to provide a simple, inexpensive and efficient one of great strength and durability, designed particularly for use on runabouts and various other vehicles that are not provided with, or are not constructed to carry tops, and capable of being readily applied to such vehicles and of being snugly folded around the seat when not in use.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation, partly in section, of a foldable vehicle top, constructed in accordance with this invention. Fig. 2 is a side elevation, the vehicle top being folded. Fig. 3 is a plan view of one side of the same. Fig. 4 is a sectional view, taken substantially on the line 4—4 of Fig. 3. Fig. 5 is a similar view on the line 5—5 of Fig. 3.

Like numerals of reference designate corresponding parts in all the figures of the drawing.

The foldable vehicle top, which is provided with a removable cover 1, comprises in its construction a plurality of foldable bows, designed to be constructed of any suitable material, such as wood, metal, or a combination of both, and composed of straight lower sections 2 and approximately U-shaped upper sections 3, having their side portions slidably connected with the lower sections 2 by means of substantially U-shaped clips 4, secured to the sides of the upper sections and forming loops to receive and embrace the lower sections of the bows. Any other suitable means, however, may be employed for slidably connecting the sections of the foldable bows. The foldable bows are preferably three in number to provide a vehicle top of the usual form, and the lower sections 2 of the bows are pivoted to the sides of the seat 5 of the vehicle to which the foldable top is applied by means of horizontal bolts 6, which also pierce front brackets 7, but the front pivots may be mounted on the sides of the seat in any other preferred manner.

The pivoted front, intermediate and rear bows are folded by sliding the upper sections downward and swinging the bows rearward. The bows are made progressively smaller to enable them to nest and fit snugly around the back and sides of the seat, as clearly illustrated in Fig. 3 of the drawing. The sections of the bows are secured in their operative position by means of thumb screws 8, mounted on the lower sections at the upper ends thereof and piercing the same and adapted to engage the sides of the upper connecting sections, as clearly illustrated in Fig. 1 of the drawing.

The intermediate bow is connected with the front and rear bows by front and rear top braces 9 and 10, composed of hinged sections and operable in the usual manner to hold the bows in spaced relation. The front braces 9 are pivoted at their front end to the upper section of the front bow and at their rear ends to the lower sections of the intermediate bow. The rear braces 10 are pivoted at their front ends to the lower sections of the intermediate bow and at their rear ends to the upper section of the rear bow.

The foldable vehicle top is also equipped with inclined rear braces or props 11, composed of hinged sections and pivoted at their lower ends by suitable bolts 12 to the sides of the seat near the back thereof and having their upper ends slidably connected by approximately U-shaped clips 13 with the sides of the upper section of the upper bow. The sides of the upper section of the upper bow are provided with recesses 14, arranged contiguous to the lower sections to permit the clips 13 to clear the same. The clips 13 are secured to the upper ends of the inclined braces 11 by suitable pivots 15, and the inclined rear braces are foldable beneath the bows when the vehicle top is folded, as clearly illustrated in Fig. 2 of the drawing. The other braces 9 and 10, which are located, respectively, at the inner and outer faces of the intermediate bow, are foldable within the spaces between the bows, as clearly shown in Fig. 3 of the drawing.

The cover, which is constructed of rubber, oil cloth, or other suitable material, is provided at the front with hooks 16, or other suitable fastening devices for securing the cover to the front bow, and the back of the seat is preferably equipped with buttons 17 for securing the back of the cover to the seat. Any other suitable means, however, may be employed for detachably fastening the cover on the bows of the vehicle top. When the cover is removed, it may be compactly arranged beneath the seat of the vehicle.

The seat is equipped at opposite sides with horizontal rear brackets 18, provided at their inner ends with upwardly and downwardly projecting lugs or attaching portions 19, which are secured to the sides of the seat. The rear brackets are arranged to receive and support the bows, which are arranged one within the other, the upper sections being at the bottom and the lower sections being arranged upon the sides of their corresponding upper sections. The bows are secured upon the rear brackets by means of a clamping plate 20, connected with the bracket by means of vertical bolts 21, having thumb nuts 22 and piercing the bracket and the ends of the clamping plate. The means for supporting and clamping the bows in their folded position, prevent the sections of the bows from rattling. The clamping plates may be easily removed and the vehicle top may be quickly unfolded and secured in proper position for use, when the weather or the sun renders it desirable to provide the vehicle with a top.

Having thus fully described my invention, what I claim as new and desire to secure by Letters Patent, is:—

1. A vehicle top including a plurality of foldable bows, each composed of opposite straight lower sections, and an approximately U-shaped upper connecting section slidably connected with the lower sections, the upper sections of the top being progressively smaller and arranged to nest and fit snugly the back and sides of a seat without disconnecting them from the vehicle, and the said lower sections being permanently pivoted at their lower ends and extending rearwardly beyond the transverse portions of the U-shaped sections when the top is folded.

2. A vehicle top including a plurality of foldable bows, each composed of opposite straight lower sections, and an approximately U-shaped upper connecting section slidably connected with the lower sections, the upper sections of the top being progressively smaller and arranged to nest and fit snugly the back and sides of a seat without detaching them from the vehicle, and the said lower sections being extended rearwardly beyond the transverse portions of the U-shaped sections when the top is folded, and a cover provided with means for detachably connecting it with the front bow and the back of the seat.

3. A foldable vehicle top including a plurality of bows composed of upper and lower sections slidably connected, a pivot connecting the lower ends of the lower sections, braces for holding the bows in spaced relation, and an inclined brace composed of hinged sections and pivoted at its lower end and having its upper end slidably and pivotally connected with one of the bows, said inclined brace being arranged to fold beneath the bows when the latter are folded.

4. A foldable vehicle top including a plurality of bows composed of upper and lower sections slidably connected, a pivot connecting the lower ends of the lower sections, braces for holding the bows in spaced relation, an inclined rear brace pivoted at its lower end, and a clip having a limited sliding movement on one of the bows and pivotally connected to the upper end of the inclined brace.

5. A foldable vehicle top including a plurality of pivoted bows composed of upper and lower sections slidably connected and arranged to fold and nest at the sides and back of a seat, a bracket arranged to receive the nested bows, an upper horizontal clamping plate for engaging each of the bows, and fastening devices connecting the clamping plate with the bracket.

6. A foldable vehicle top including a plurality of bows arranged to nest and composed of upper and lower sections exteriorly slidable on each other, the lower section being extended rearwardly beyond the upper sections in the folding of the top, a pivot connecting the lower ends of the lower sections, clips slidably connecting the sections, braces pivoted to the bows and adapted to hold the same in spaced relation and foldable between the bows, and an inclined brace connected with one of the bows and composed of hinged sections and foldable beneath the bows.

In testimony, that I claim the foregoing as my own, I have hereto affixed my signature in the presence of two witnesses.

WILLIAM S. BUTLER.

Witnesses:
 KINGSLEY MONTGOMERY,
 MARY F. HUMBERT.